(12) United States Patent
Matsuo et al.

(10) Patent No.: US 6,549,297 B1
(45) Date of Patent: Apr. 15, 2003

(54) COMMUNICATION APPARATUS AND SPEECH MESSAGE METHOD

(75) Inventors: Hideo Matsuo, Zama (JP); Kazumi Anzai, Yokohama (JP); Hitoshi Miyazaki, Chigasaki (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 09/204,305

(22) Filed: Dec. 3, 1998

Related U.S. Application Data

(62) Division of application No. 08/731,149, filed on Oct. 10, 1996, now Pat. No. 5,923,827, which is a continuation of application No. 08/335,343, filed on Nov. 3, 1994, now Pat. No. 5,598,548.

(30) Foreign Application Priority Data

Nov. 10, 1993 (JP) .............................. 5-280834

(51) Int. Cl.[7] .............................................. G06F 13/00
(52) U.S. Cl. ...................... 358/1.17; 358/1.16; 358/444
(58) Field of Search ............................. 358/1.15, 1.16, 358/1.17, 444, 404, 442, 468

(56) References Cited

U.S. PATENT DOCUMENTS

| | | | |
|---|---|---|---|
| 3,801,964 A | 4/1974 | Palfi et al. | |
| 4,156,926 A | 5/1979 | Hartman | |
| 4,870,574 A | 9/1989 | Limisimaque | |
| 4,943,868 A | 7/1990 | Yoshinaga et al. | |
| 5,163,082 A | * 11/1992 | Karnowski | ................... 379/88 |
| 5,220,438 A | 6/1993 | Yamamoto | |
| 5,268,768 A | 12/1993 | Terasaka | |
| 5,357,475 A | 10/1994 | Hasbun et al. | |
| 5,442,768 A | 8/1995 | Sudoh et al. | |
| 5,500,742 A | 3/1996 | Kamijo | |
| 5,504,806 A | 4/1996 | Kawakami | |
| 5,581,723 A | 12/1996 | Hasbun et al. | |
| 5,598,548 A | 1/1997 | Matsuo et al. | |
| 5,600,821 A | * 2/1997 | Falik et al. | .................. 711/173 |
| 5,611,067 A | 3/1997 | Okamoto et al. | |
| 5,673,383 A | 9/1997 | Sukegawa | |

FOREIGN PATENT DOCUMENTS

| | | |
|---|---|---|
| JP | 56121138 | 9/1981 |
| JP | 61235994 | 10/1986 |
| JP | 62145451 | 6/1987 |
| JP | 63158683 | 7/1988 |
| JP | 1217653 | 8/1989 |

OTHER PUBLICATIONS

Two Office Actions from related Japanese application with partial translations.

* cited by examiner

*Primary Examiner*—Mark Wallerson
(74) *Attorney, Agent, or Firm*—Stevens, Davis, Miller & Mosher, LLP

(57) ABSTRACT

A memory management device enables to effectively use a memory which permits its stored data to be erase only in blocks. A facsimile apparatus is arranged to temporarily store sending information and received information in the memory and them to send or received the information. The facsimile apparatus includes a flash memory whose data is allowed to be erased only in blocks and a storage unit for storing the sending or the received information in its own blocks if the sending or the received information is stored in the flash memory.

12 Claims, 9 Drawing Sheets

FIG. 3

ERASE BLOCK MANAGEMENT AREA

| MANAGEMENT INFORMATION | STORED INFORMATION |
|---|---|
| BLOCK ERASING STATE | 1. YET   0. DONE |
| BLOCK USING INFORMATION | 1. NOT IN USE  0. IN USE |
| IN-BLOCK MEMORY INFORMATION | 1. ROOM TO SPARE  0. NO ROOM |
| FILE ITEM | 0. SENDING<br>1. RECEIVED<br>2. MESSAGE OF ANSWERING PHONE<br>3. RESPONSE MESSAGE<br>4. TIMER SENDING<br>5. FAX BULLETIN BOARD |
| ERASE BLOCK LOCATION | 1. EXCEPT HEAD  0. HEAD |
| NUMBER OF NEXT ERASE BLOCK | 00~FE<br>( FF IS THE TAIL ) |

FIG.5

MEMORY BLOCK MANAGEMENT AREA

| MANAGEMENT INFORMATION | STORED INFORMATION |
|---|---|
| FILE ERASING STAGE | 1. NOT ERASED  0. ERASED |
| FILE USING INFORMATION | 1. NOT USED  0. USED |
| NEXT ERASE BLOCK LOCATION | 00~FE (FF IS THE TAIL) |
| NEXT MEMORY BLOCK LOCATION | 00~FE (FF IS THE TAIL) |
| MEMORY IN-BLOCK DATA LENGTH | BYTE NUMBER |
| DIRECTORY STATE | 1. NO  0. USED |
| DIRECTRY INFORMATION | 1. NOT CLOSED  0. CLOSED |
| NEXT PAGE ERASE BLOCK LOCATION | 00~FE (FF IS THE TAIL) |
| NEXT PAGE MEMORY BLOCK LOCATION | 00~FE (FF IS THE TAIL) |

FIG.9

| DEC. 25 | 14 : 34 |

| ERASE  BULLETIN  BOARD ? |

| UNDER  ERASING |

| DEC. 25 | 14 : 34 |

COMMUNICATION APPARATUS AND SPEECH MESSAGE METHOD

This is a division of application Ser. No. 08/731,149 filed Oct. 10, 1996 now U.S. Pat. No. 5,923,827 which in turn is a continuation of application Ser. No. 08/335,343 filed Nov. 3, 1994 (now U.S. Pat. No. 5,598,548).

BACKGROUND OF THE INVENTION

1. Field of the Invention

The present invention relates to a memory management device which operates to divide a memory into storage blocks so that the stored content is allowed to be erased only in blocks and a facsimile apparatus which is arranged to use the memory management device.

2. Description of the Related Art

Dynamic RAMs (DRAM) and static RAMs (SRAM) are representatively used as memories. The DRAM needs to periodically rewrite data even if it is powered on, while the SRAM operates to hold data only if it is powered on. Both of these memories fail to hold their data without their powers. These memories are required to have a spare battery for backing them up when the power is interrupted. On the other hand, the ROMs are capable of holding data if the power is off, while the ROM often has difficulty in rewriting data. The EPROMs are capable of rewriting data again and again only if ultraviolet rays are applied thereto. Regrettably, however, the EPROM is required to rewrite all the content stored therein. The EEPROM allows a program scored therein to be electrically erased. The program can be erased also in bits. Further, a kind of ROM called as a flash memory has been currently used. The flash memory has a capability of erasing the stored data in blocks, that is, block by block.

As mentioned above, nowadays, many kinds of memories have been commercially made available. Those memories have their merits and demerits. It is now desirous to provide such a memory as keeping the same ease of use as the DRAM or the SRAM and needing no power back-up. The DRAM or the SRAM is capable of easily changing a value of 1 or 0 at the current bit into a value of 0 or 1. On the other hand, the ROM state. If some data is written in the ROM, the values of 1 at the bits corresponding to the written data are changed to the values of 0. To return the 0's to the 1's, the ROM is required to do an erasing operation. Hence, unlike the DRAM, the ROM cannot easily change from the 0's to the 1's. For erasing the stored data, the EPROM enables to only erase all the data. The flash memory enables to erase the data only in blocks. Further, like the DRAM, the EEPROM has a capability of erasing the data in bits, that is, bit by bit. The EEPROM, however, is so expensive that it is not made available for general-purpose goods.

SUMMARY OF THE INVENTION

The present invention is designed to overcome the above-mentioned shortcomings, and it is an object of the present invention to provide a memory management device which achieves more efficient use of a memory whose data is erased only in each storage block and a facsimile apparatus which is arranged to use the memory management device.

In carrying out the object, according to a first aspect of the present invention, a memory management device provides a memory which enables to merely reverse the initial value at each bit and control means which operates to control the memory as considering the bit-by-bit reversed state from the initial state on the memory as a starting state.

According to a second aspect of the present invention, a memory management device provides a memory which operates to divide its storage area into blocks and erase the data only in a block-by-block manner, control means which sectionalizes the blocks according to the erasing condition of the information to be stored and store the information in the block having the corresponding erasing condition, and erasing means for erasing the stored content of the block only if the erasing conditions of all the stored informations about each block are met.

According to a third aspect of the present invention, a facsimile apparatus for temporarily storing the sending information or the received information in a memory and performing a series of operations containing sending or recording, provides the memory which operates to divide a storage area into blocks and erase the data only in blocks and storing means which operates to store the received information or the sending information in the sectionalized blocks if the information is to be stored in this memory.

According to a fourth aspect of the present invention, a facsimile apparatus for temporarily storing sending information and received information in a memory and then performing a series of operations containing sending or recording, provides the memory which operates to divide a storage area into blocks and erase the data only in blocks and control means which operates to read the data from the head of a group of empty blocks concatenated in a predetermined sequence if data is to be stored in one of the blocks of the memory.

According to a fifth aspect of the present invention, a facsimile apparatus for temporarily storing sending information or received information in a memory and then performing a series of operations containing sending or recording, provides the memory which operates to divide a storage area into blocks and erase the data only in blocks, storing means which operates to sectionalize the blocks for the sending information and the received information, and erasing means which operates to erase the sending information of one block when all the sending informations of the block are sent out or erase the received information of another block when a series of operations containing recording are done for all the received informations of the block.

According to a sixth aspect of the present invention, a facsimile apparatus for temporarily storing sending information or received information in a memory and then performing a series of operations containing sending or recording, provides the memory which operates to divide its storage area into blocks and erase the data only in blocks, erasing means which operates to erase the stored content of the memory in blocks, and control means which operates to couple the block whose content is erased by the erasing means to the tail of a group of empty blocks concatenated in a predetermined sequence.

According to a seventh aspect of the present invention, a facsimile apparatus for temporarily storing sending information or received information in a memory and then performing a series of operations containing sending or recording, provides the memory which operates to divide its storage area into blocks and erase the data only in blocks, erasing means which operates to erase the content stored in the memory in a block-by-block manner, and control means which operates to count the empty blocks if a sending or receiving operation is requested while the content of the block is being erased, perform the requested operation if it is equal to or more than the regulated number or keep to erase the data stored in the blocks until the number of actual empty blocks reach the regulated number, and then perform the requested operation.

According to an eighth aspect of the present invention, a facsimile apparatus for temporarily storing sending information or received information in a memory and then performing a series of operations containing sending or recording, provides the memory which operates to divide its storage area into blocks and erase the data only in blocks, erasure indicating means for indicating erasure of a block content, display means which operates to change the management data of an indicated block to the content of the block according to the erasing indication and display the erasing information of the block, and erasing means which operates to erase the content of the block whose management data is changed after the erasing information is displayed in the display means.

In the first aspect of the present invention, in the case of handling the memory, the memory is just allowed to be reversed from the initial state. Hence, the state reversed from the initial state in a bit-by-bit manner is used as a flag representing the starting state of the memory. This means that the initial state represents the waiting state.

In the second aspect of the present invention, the used memory operates to divide the storage area into blocks and erase the data only in blocks. Each block stores only the pieces of information having the same erasing condition. If the erasing conditions of all the pieces of information in the block are met, the informations in the block are erased. The informations having the same erasing condition often have a short period from when it is stored to when the erasing condition is met. On the other hand, if the pieces of information stored in one block have a different erasing condition rather than any other condition, a relatively long period is required until the erasing conditions of all the pieces of information stored in the block are met. By storing the informations having the same erasing condition in the same block, therefore, the content of the block is allowed to be quickly erased. The block is used for storing the new information. This serves to enhance the using effect.

In the third aspect of the present invention, in a case that the memory arranged to divide the storage area into blocks and erase the data in blocks is provided to the facsimile apparatus as a memory for storing the sending and received informations, if, at first, the sending or the receiving information is stored in one block, only the same type of information stored at first is stored in the block, so that both the received and the sending informations are not allowed to be stored in one block. If one kind of information is stored in one block and the other kind of information is stored in another block, the period taken when all the sending data in one block is sent or the period taken when all the receiving data in the block is recorded is shorter than the period if both kinds of data are stored in one block.

In the fourth aspect of the present invention, in a case that the memory arranged to divide the storage area into blocks and erase the data only in blocks is provided to the facsimile apparatus as a memory for storing the sending and the receiving informations, the empty blocks are concatenated in sequence for management so that the blocks are picked from the head one for storing the data therein. This makes it possible to evenly use all the blocks, thereby reducing the probability of failure in each block and hence prolonging the life of the memory.

In the fifth aspect of the present invention, in a case that the memory arranged to divide the storage area into blocks and erase the data only in blocks is provided to the facsimile apparatus as a memory for storing the sending and the received informations, either one of the sending information and the receiving information is stored in one block. If all the recorded sending informations are sent from the block where they are recorded, the data in the block is erased. On the other hand, when all the receiving informations are recorded in the block for recording only the received information, the overall information in the block is erased. In this state, the probability of establishing the erasing condition about all the informations in each block is higher than the probability given when both of the sending and the received informations are stored in one block. Hence, the period from when the data is stored in one block to when the data is erased from the block is reduced, thereby allowing the using ratio of the blocks to be enhanced.

In the sixth aspect of the present invention, in a case that the memory arranged to divide the storage area into blocks and erase the data only in blocks is provided to the facsimile apparatus as a memory for storing the sending and the received informations, if the erasing condition is met and the data is erased in blocks, the block whose content is erased is coupled to the tail of the empty blocks concatenated in the predetermined sequence. The blocks whose contents are erased are coupled in the erasing sequence. Hence, if the empty blocks are used, those blocks are allowed to be evenly used.

In the seventh aspect of the present invention, in a case that the memory arranged to divide the storage area into blocks and erase the data only in blocks is provided to the facsimile apparatus as a memory for storing sending and received informations, the erasing means operates to erase the block data if the erasing condition is met in the block. If the sending or receiving operation is requested while the block data is being erased, it is checked whether or not the number of empty blocks is equal to or more than the given number before the operation is executed. This makes it possible to secure storage of the regulated sending or receiving amount. If the number is less than the regulated number, the operation is executed to erase the data of the blocks whose erasing conditions are met until the number of the empty blocks reaches the regulated number. Then, the sending or receiving operation is executed.

Moreover, in the seventh aspect of the present invention, in a case that the memory arranged to divide the storage area into blocks and erase the data only in blocks is provided to the facsimile apparatus as a memory for storing the sending and the received informations, the received information may contain the information like a received message of an answering phone which is not permitted to be erased without judgement of a receiver. In this case, the erasure indicating means operates to indicate the erasure. In response to this indication, the display means operates to display the erasure of the block as keeping only the erasing management information of the block in the state that the block is erased. The erasing means operates to erase the content of the block. By this operation, an operator for indicating the erasure can quickly make sure that the erasure is done through the effect of the erasure indicating means. Hence, the operator does not need to wait until the actual erasure is done.

BRIEF DESCRIPTION OF THE DRAWINGS

FIG. 3 is a view showing an arrangement of an erase block management area;

FIG. 5 is a table showing an arrangement of a memory block management area;

FIG. 9 is a view showing an example of displaying the erasing state of the flash memory.

DESCRIPTION OF THE PREFERRED EMBODIMENTS

Later, the description will be oriented to a memory management device according to an embodiment of the present invention with reference to the drawings.

Figure 1:
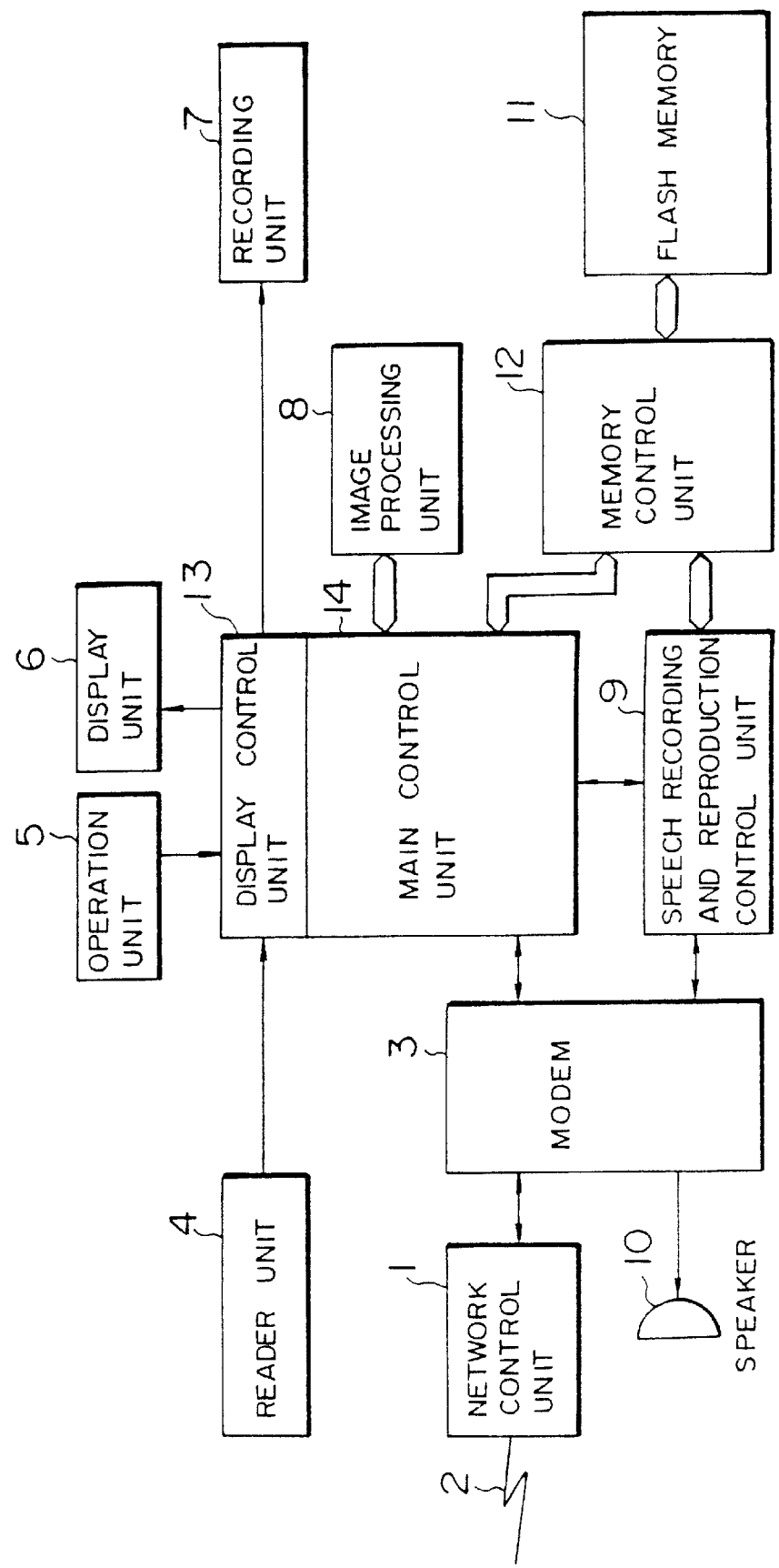
FIG. 1 is a block diagram showing an overall arrangement of a memory management device according to an embodiment of the present invention.

FIG. 1 is a block diagram showing an arrangement of the memory management device. In FIG. 1, a numeral 1 denotes a network control unit which is connected to a line 2 so that the network control unit 1 controls the connection with a line exchange network, concretely, performs calling, releasing or dialing. A numeral 3 denotes a modem which operates to modulate data to be sent into a signal or demodulate the received data into an original signal. The signal is suitable for data transmission through a phone line. A numeral 4 denotes a reader unit which operates to read a manuscript to be sent or copied. A numeral 5 denotes an operation unit through which an indication given by an operator such as a phone number or settings of an answering phone. A numeral 6 denotes a display unit which operates to display a response or a guide to the operator such as an inputted phone number. A numeral 7 denotes a recording unit which operates to print the received data or the data read by the reader unit 4.

A numeral 8 denotes an image processing unit which operates to magnify, reduce, rotate or move the read image or the image to be recorded. A numeral 9 denotes a speech recording and reproduction control unit which operates to control recording of a speech in the answering phone or reproduction of the speech through a speaker. A numeral 11 denotes a flash memory which operates to store the received information, the data to be sent from the memory, or a speech message of the answering phone. A numeral 12 denotes a memory control unit 12 which operates to control the flash memory 11 for storing data to be sent by a facsimile, data received by the facsimile or speech data sent by a phone. A numeral 13 denotes a display control unit which operates to control the reader unit 4, the operation unit 5, the display unit 6 and the recording unit 7. A numeral 14 denotes a main control unit which operates to control the overall arrangement of the device and decode the data received by the facsimile or code the data to be sent thereby.

Figure 2:
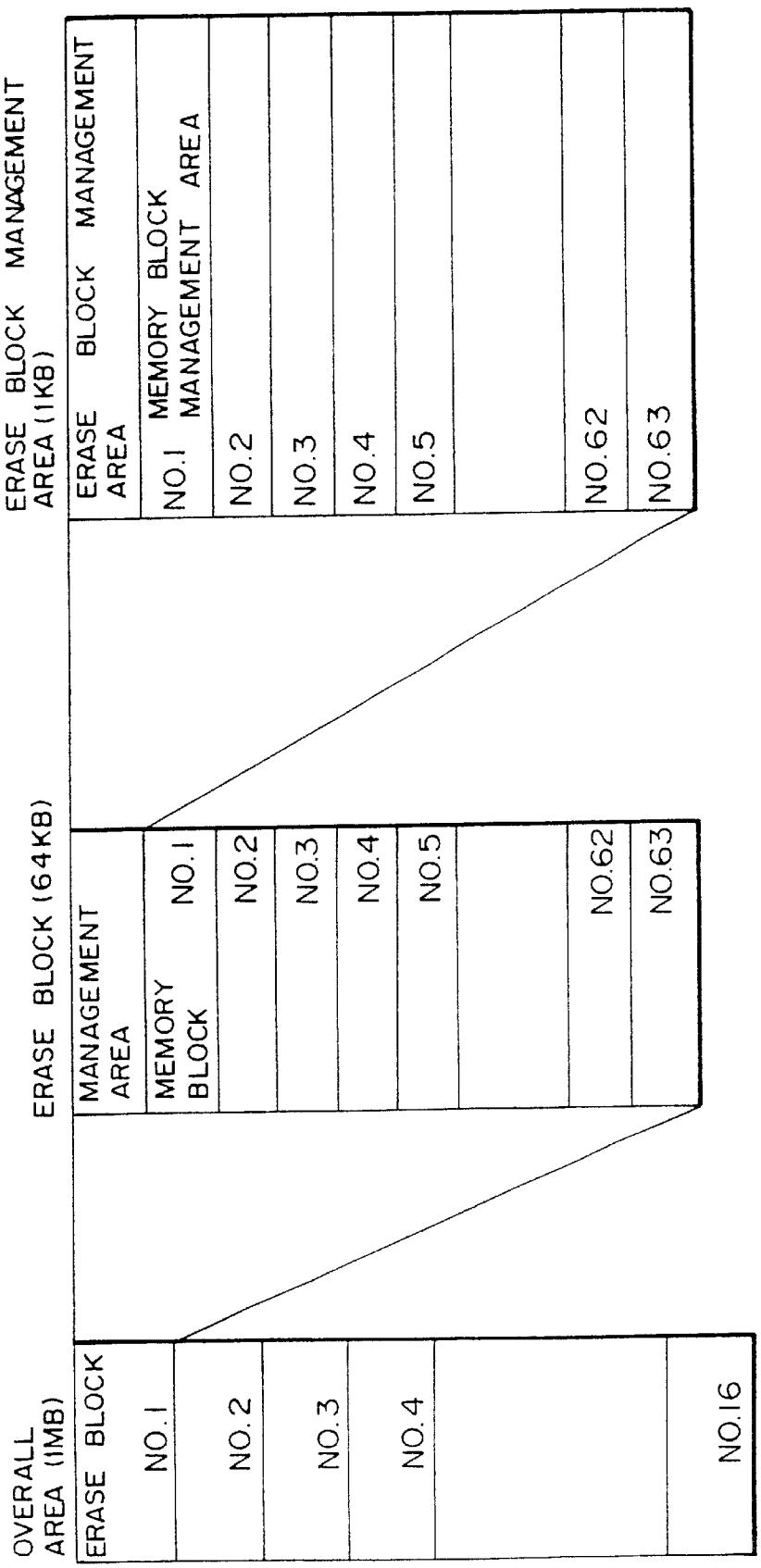
FIG. 2 is a view showing an arrangement of a flash memory used in the embodiment.

FIG. 2 is a view showing an arrangement of the flash memory 11 used in the facsimile apparatus of this embodiment. As shown in FIG. 2, the flash memory used in this embodiment has a volume of 1 MB. The storage volume is divided into erase blocks, each of which has a volume of 64 KB. The stored data is erased in units of one erase block. Each erase block is composed of one management area for storing management information and 63 memory blocks each for storing data. This management area is composed of an erase block management area for scoring information indicating the state of the corresponding erase block and a memory block management area for storing information indicating the state of the corresponding memory block. As the memory block management area, 63 areas are prepared in order to correspond to the 63 memory blocks respectively.

FIG. 3 is a view showing the arrangement of the erase block management area shown in FIG. 2. Now, each item provided in the erase block management area will be described later. The management area holds two types of informations, that is, management information and stored information. The management information contains a block erasing state, a block using information, an in-block memory information, a file item, an erase block location, and a next erase block number. The block erasing state indicates whether or not the corresponding erase block is logically erased. The block using information indicates whether or not the erase block is in use. The in-block memory information indicates whether or not a memory block in the erase block is empty, that is, any non-used memory block is left. The file item indicates what kind of information is stored in the erase block. The informations indicated as the file item contain data to be sent (referred to as sending data), received data, a received message and a response message of an answering phone, transmission to be done by a timer (referred to as timer transmission), and a bulletin board to be sent by a facsimile (referred to as facsimile bulletin board). Each erase block stores only one kind of those informations. Another kind of information is stored in another erase block. This is because the data is erased in unit of one erase block. If each erase block stores the same kind of information, all the erasing conditions of the stored informations are met for quite a short time. The erasing condition means the termination of transmission of the data for the transmission data or the termination of recording the data for the received data. On the condition, the data is allowed to be erased from the flash memory.

Figure 4:
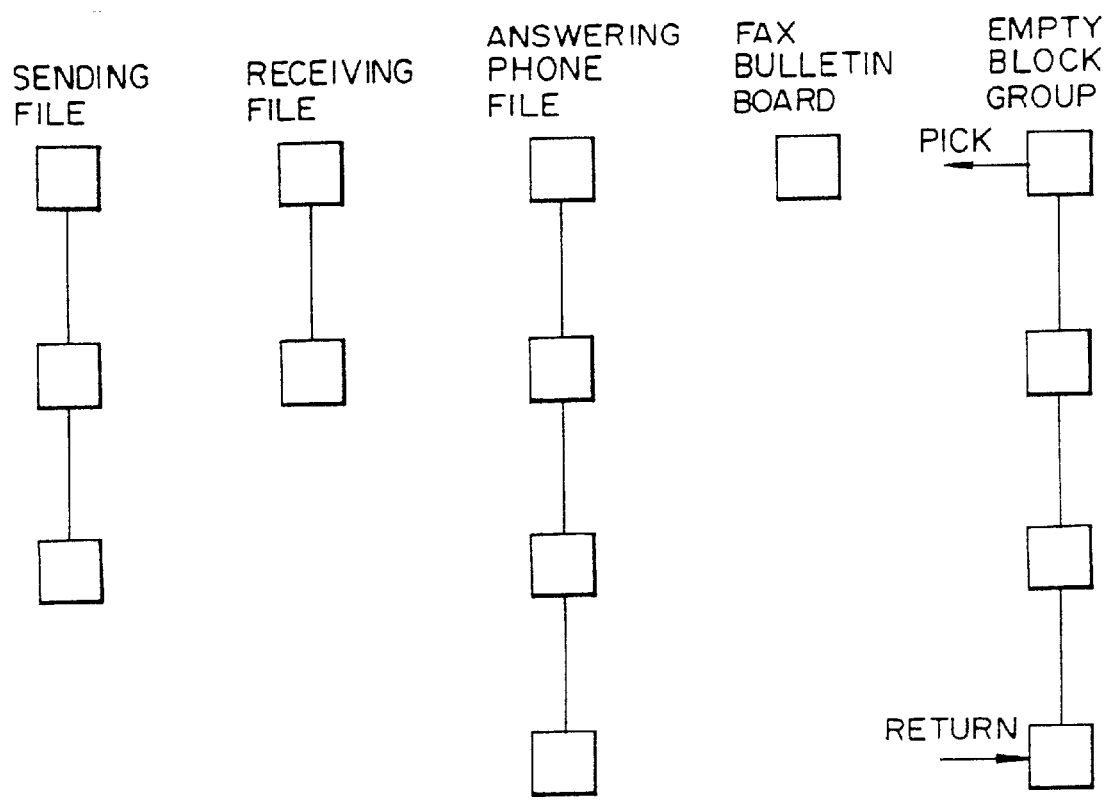
FIG. 4 is an explanatory view illustrating the use of an erase block in each file.

The location of the erase block actually indicates the location where the empty erase blocks are ranged in a column for waiting for the data input. With reference to FIG. 4, the using state of the erase block will be described. A file is prepared for each kind of informations to be stored. Each erase block is made to be a leased block for the file when the erase block is used for each file. Each erase block is generated as a leased block for each file. When the total volume of the erase block goes beyond 64 KB, the next new erase block is generated and then is chain-coupled to the full erase block. The empty blocks are chain-coupled so that it is used from the head of the block chain. Further, the data-erased block is given back to the tail of the empty block chain. This makes the erasing time of each erase block uniform. Going back to FIG. 3, the next erase block number indicates the number of a next chained erase block if the erase block is chain-coupled to the empty blocks.

The storage information of FIG. 3 is a flag for representing the state of the management information title located in the left side. Except the file item contained in the management information, the initial state is indicated by 1 and the starting state is indicated by 0. For example, in the block erasing state, a non-used state (initial state) is 1, while a used state is 0. For the file item, each kind of information has the corresponding number. The next erase block number indicates FF (hexadecimal representation) given when the erase block is coupled to the tail of the empty blocks. If the next erase block is coupled similarly, the next erase block number indicates the number (00 to FE) of that erase block. As mentioned above, the initial state is 1 and the starting state is 0. This is because the flash memory allows the inversion of 0 to 1 to be executed only by erasure, so that the operation of writing data to the memory allows only the change of 1 to 0.

FIG. 5 shows an arrangement of each memory block management area in the erase block management area shown in FIG. 2. Like FIG. 3, the memory block management area holds the management information and the storage information. The management information contains a file erasing state, a file using information, a next erase block location, a next memory block location, a memory in-block data length, a directory state, a directory information, a next page erase block location, and a next page memory block location. The file erasing state indicates whether or not a file stored in the corresponding memory block is erased. This information is meaningless unless it is related to the next file using information and any file is stored. The file using information indicates whether or not the corresponding memory block is in use. As shown in FIG. 4, since the erase blocks being used are coupled for each file, the next erase block location indicates the number of an erase block coupled next to the erase block to which the memory block belongs. If the subject erase block is located at the end of the chain, the number indicates FF. The next memory block location means the number of the next located memory block. The memory in-block data length represents the amount of data in the memory block by the number of bytes. In the directory state, it is declared that the use of the management area is prioritized if the state is determined as "0: in use". Further, the memory blocks for each page are collectively managed. The directory information indicates whether or not the information is stored in the memory block(s) composing the directory. If so the directory information indicates "0" for "closed", while if not, the directory information indicates "1" for "not closed". The next page erase block location represents the location of the first erase block of the next page if the data is sent or received in a page unit. The next page memory block location represents the location of the first memory block of the next page. Like the description about FIG. 3, in the storage information located in the right side of FIG. 5, the initial state is represented by 1, while the starting state is represented by 0.

The description will be oriented to the operation of the facsimile apparatus having the flash memory 11 arranged as described above with reference to the flowcharts.

Figure 6:
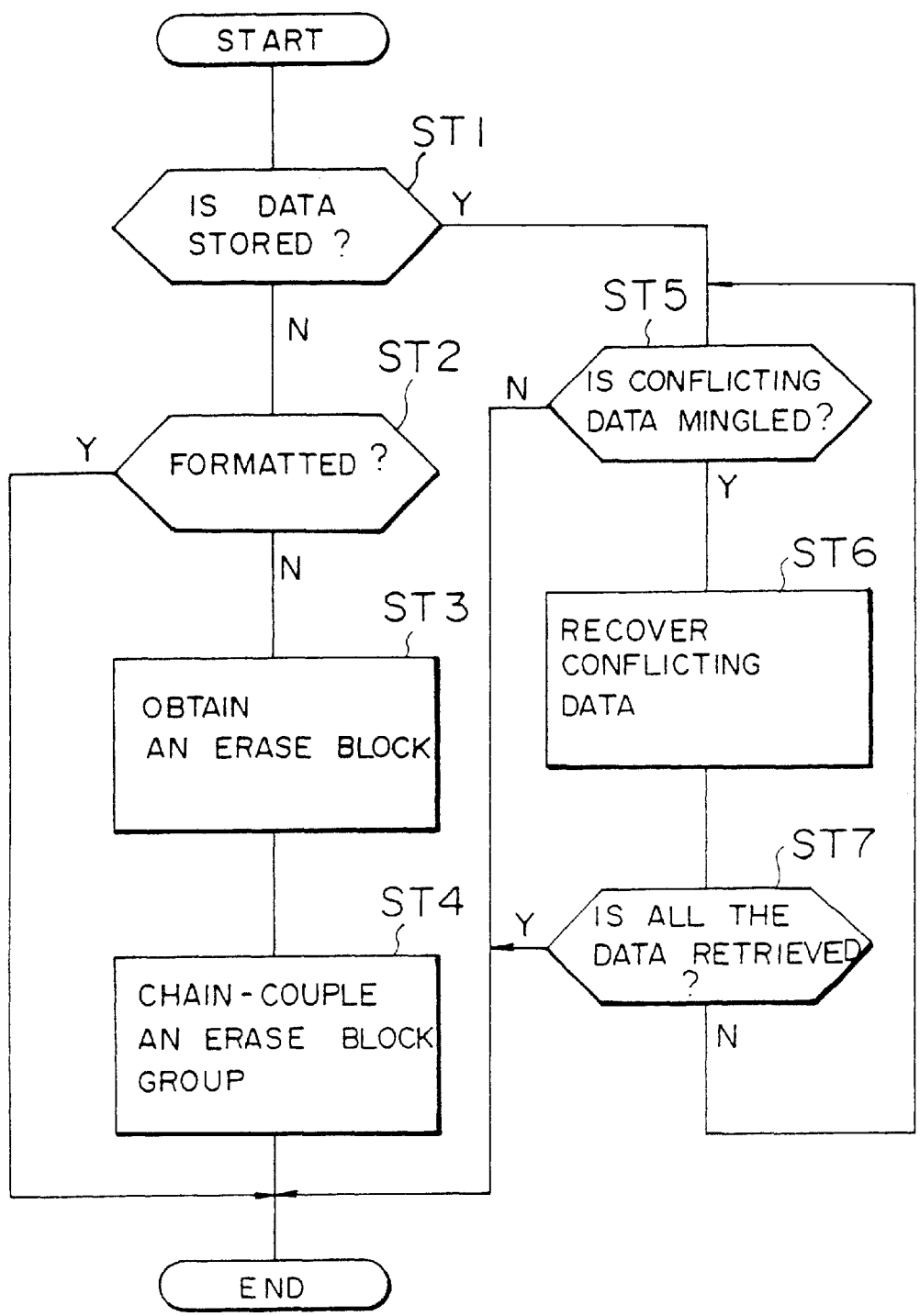
FIG. 6 is a flowchart showing a checking operation of the flash memory when it is powered.

FIG. 6 is a flowchart showing the operation of the facsimile apparatus when it is powered on. When the facsimile apparatus is turned on, the operation is executed to determine whether or not data is stored (ST1). If it is determined that no data is stored, it is determined whether or not the flash memory is formatted in a predetermined manner (ST2). If the flash memory is not formatted, it is determined that the flash memory is new. Then, the flash memory is divided into erase blocks, which corresponds to an erase unit (ST3). The generated erase blocks are all empty. Hence, these empty erase blocks are chain-coupled as an empty block group as described with respect to FIG. 4 (ST4).

If at the step ST1 it is determined that data is stored, it is determined whether or not any conflicting piece of data exists (ST5). Herein, the operation is executed to search the data whose directory state indicates "not in use" and directory information indicates "not closed". Such a conflicting piece of data may take place when the power interruption causes the operation to be suspended while a file is being created. If the conflicting piece of data is found, the recovery process is executed (ST6). The recovery process varies according to the place where the operation is suspended. If the conflicting data may be saved, the directory of the data is changed from "not closed" to "closed". If it may not be saved, the data of the erase block to which the memory block belongs is erased. According to this operation, all the data is retrieved (ST7) and the conflicting piece of data is recovered. Then, the flow given when the facsimile is powered is terminated.

Figure 7:
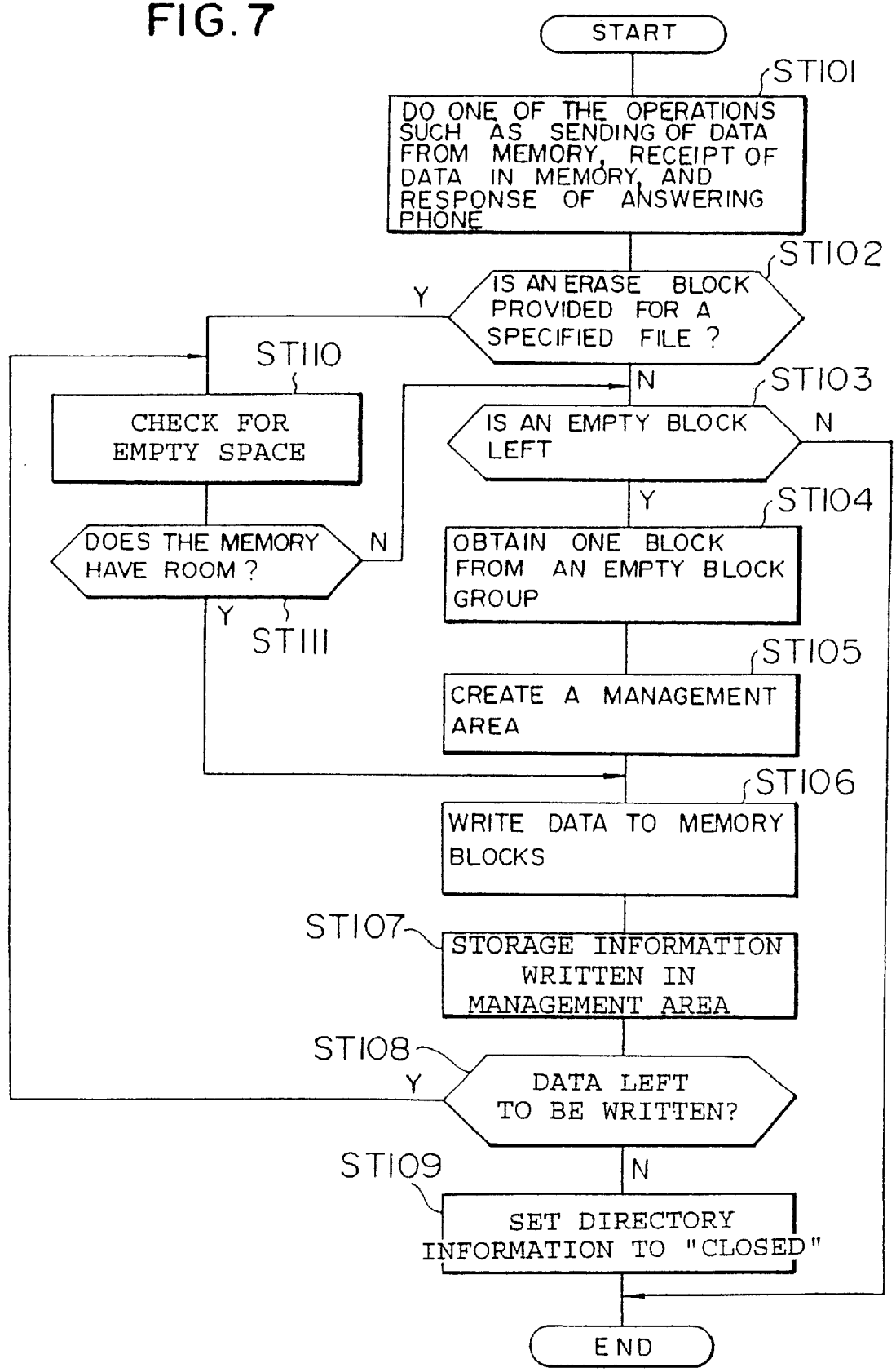
FIG. 7 is a flowchart showing an operation of writing data to the flash memory.

Next, the operating flow of writing data to the flash memory 11 will be described with reference to FIG. 7. Any one of processes is executed such as sending of data from the memory, receipt of data in the memory, receipt of a speech by an answering phone, sending of data by a timer, notice of the bulletin board sent by a facsimile (e.g., as in a facsimile-on-demand system) (ST101). Then, the operation is executed to check whether or not the erase block is provided for the file corresponding to the executed process (ST102). As described with respect to FIG. 4, this is executed for determining whether or not an erase block group is provided for each file. This is determined from the file item of the erase block management area shown in FIG. 3. If no erase block corresponding to the process is found, one erase block is obtained from the head of the empty block group shown in FIG. 4 (ST104).

The file item of the given process is described in the management area of the obtained erase block. Then, the block using information is made to be in use and the directory state of the memory block management area is also made to be in use (securing the directory area) (ST105). The data of the corresponding file is written in memory blocks to which the erase block belongs (ST106). In the management area of the memory block in which data is written, the file using information is determined to be in use and the storage information such as a number of bytes of the written data is written in the management area (ST107). If the data is overflown out of one memory block, that is, there remains data left to be written (ST108), the operation is executed to check whether or not the in-block memory information of the management area of the erase block indicates "there exists empty space" (ST110). If yes (ST111), the data is written to the next memory block (ST106) and the storage information described at step ST107 is written in the management area of this memory block. At this time, the number of the memory block in which data writing has just terminated is written in the location of the next memory block to this memory block management area, and the memory blocks are chain-coupled with each other. By iterating the loop composed of the steps ST106 to 108, 110 and 111, the data is written in the memory block. If the erase block is full of data during the writing of data, the operations at the steps ST103, 104 and 105 are executed to obtain an empty block so that the remaining data is written in the obtained memory block.

After doing these operations, if no data is left (ST108); the storage informations of the erase block management area and the memory block management area are made to indicate the data-written states. Then, the directory information is made to be set as "closed" (ST109), and the operation is terminated. If no empty block is found at the step ST103, no more data is allowed to be stored. Hence, the operation is terminated.

Figure 8:
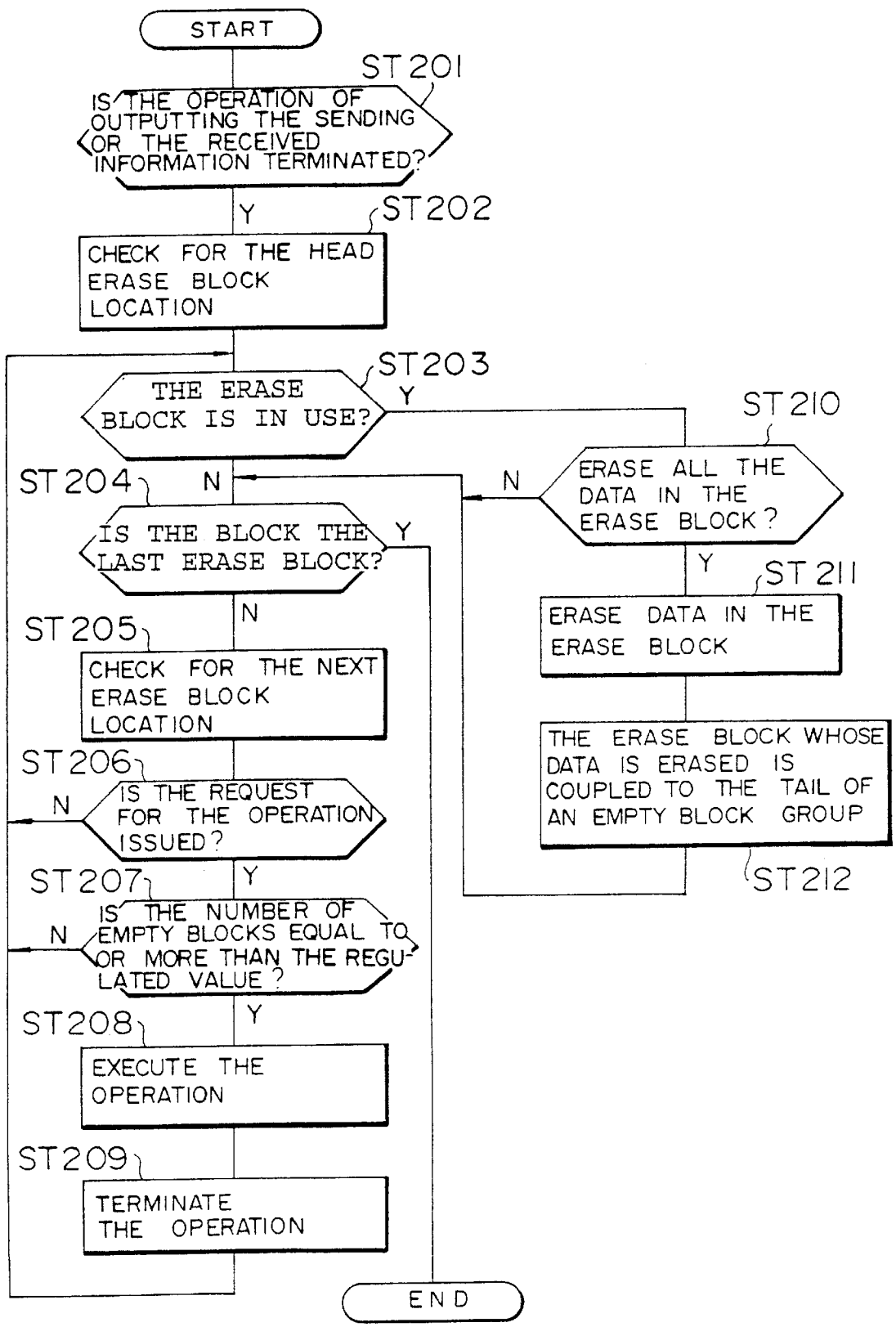
FIG. 8 is a flowchart showing an operation of erasing data from the flash memory.

In turn, the description will be oriented to the flow of erasing the data stored in the flash memory at an erase block unit with reference to FIG. 8. At first, it is checked that the operation such as sending of data from the memory, receipt of data in the memory or response of an answering phone is terminated (ST201). Next, the erase block is examined and it is checked that the block corresponds to the head one (NO.1) of the blocks NOs.1 to 16 indicated in the left side of FIG. 2 (ST 202). Then, based on the block using information of the erase block management area, it is also checked whether or not the erase block is in use (ST203). If it is not in use, it is checked whether or not the erase block is the last erase block (NO.16) (ST 204). If it is not, a check is done to determine whether or not the erase block corresponds to the next one (ST205).

If at the step ST203 the erase block is in use, it is determined whether or not the data in all the memory blocks of the erase block is to be erased (ST210). If the data is to be sent (e.g., fax transmission), the data is erased upon termination of sending of the data while if the data is to be received (e.g., fax reception), the data is erase upon termination of recording of the data. If one erase block contains even one piece of a (one memory block) not to be erased, the operation goes to the step ST204 without erasing the erase block. If all the data contained in the erase block are to be erased, the erase block is allowed to be erased (ST211). Then, the erase block whose data is erased is chain-coupled to the tail of the empty block group as shown in FIG. 4 (ST212). This chain-coupling is logically executed based on the information stored in the erase block management area shown in FIG. 3. It is therefore unnecessary to change the initial storage information upon erasure. That is, in the storage information, the block erasing state is "not", the block using information is "not used", . . . , and the number of the next erase block indicates the tail "FF".

After checking the next erase block at the step ST205, it is checked whether or not the request for the operation at the step ST201 is issued (ST206). If it is issued, it is checked whether or not the number of empty erase blocks is equal to or more than the regulated value (ST207). To count the number of the empty erase blocks, the block using information of the overall erase block management area is checked. That is, if the information about each erase block indicates "not used", the number of the "not used" erase blocks is counted. The regulated value is defined by the data about sending and receipt treated by the facsimile apparatus. If the number of the empty blocks is equal to or more than the regulated value, the erasing work is interrupted, the requested operation is executed (ST208). After the operation is terminated (ST209), the serial processes at the steps ST203, ST204 and ST210 to ST212, which was executed by the first erase block, are carried out for the next erase block. These processes are repeated until the subject block reaches the last one (NO.16) (ST204). By performing such an erasing operation periodically or in response to an indication given by the operation unit 5, it is possible to efficiently use the flash memory 11.

Next, the description will be oriented to how an operator erases the content of the memory part. In the case of a message received by the answering phone, the message cannot be erased only after the receiver listens to the message. Further, for the facsimile bulletin board, if no notice period is indicated, an operator other than the person posting the notice cannot understand how long the bulletin board is to be noticed. To cope with this, the facsimile apparatus has to be arranged so that the noticer can give a proper indication of erasing the board through the operation unit 5. In this case, in order for the operator to make sure of the erasure, the erasing state is displayed on the display unit 6.

FIG. 9 shows a display example appearing when the data is erased. This example concerns with the case that the operator erases the notice on the facsimile bulletin board. Normally, the display unit 6 displays the date and the time.

If an indication of erasing the board is given, to make sure of the indication, the sentence "Is Bulletin Board Erased ?" appears on the display unit 6. Next, "Under Erasing" appears thereon. Then, the original date and time are displayed. This shift of the display is so short that the operator can feel the erasure is immediately terminated.

To erase one erase block, however, the facsimile apparatus of this embodiment needs about two seconds. It means that a considerable time is required for erasing the content stored in plural erase blocks. On the display, therefore, the block erasing state of the erase block management area is shifted from "yet" to "done" and the data erasion of the erase block is terminated. After this display, the erasing operation is performed along the flowchart shown in FIG. 8. This makes it possible to realize a more convenient facsimile apparatus.

As is obvious from the above description, according to the present invention, if the facsimile apparatus uses such a memory as allowing the data to be erased in blocks, the memory may hold the same operativity as the conventional DRAM or SRAM if the way of use is properly selected. Further, the memory used in the present invention does not need a power supply for holding the stored content. It means that the memory may be easily used. The present invention has the following effects (1) to (8).

(1) In the case of using the memory in bits, by setting the initial state as a waiting state and the state reversed from the initial state as a starting state, like the conventional memory, the memory may be used as a flag.

(2) Since the memory is managed so that one block stores only the same kind of information, the period when the erasing condition of the block becomes satisfactory is made shorter and thereby the data of the block may be erased quickly. This enables to enhance the efficiency of using the memory.

(3) In a case that the facsimile apparatus uses a memory which enables to store data only in blocks, the memory may be arranged so that one block stores only the sending information, while another block stores only the received information. In this arrangement, the period when the erasing condition is made satisfactory in each block is made shorter and thereby the erasure is made faster. This enables to enhance the efficiency of utilizing the blocks in the memory.

(4) In a case that the facsimile apparatus uses a memory which enables to store data only in blocks, the empty blocks are logically arranged in a line so that these blocks are picked from the head. As such, the probability of evenly using the blocks is made higher and thereby the failure takes place less frequency. This leads to extending the life of the memory.

(5) In a case that the facsimile apparatus uses a memory which enables to store data only in blocks, the sending information and the received information are stored in respective blocks. This serves to shorten the period when the erasing conditions of the informations are met. Immediately when the conditions are met, these informations are erased. This makes it possible to process a lot of data even with a small amount of volume.

(6) In a case that the facsimile apparatus uses a memory which enables to store data only in blocks, if the block data is erased after the condition is met, the block is connected to the tail of the empty blocks, so that the empty blocks are coupled in the using sequence. This makes it possible to evenly use the blocks, thereby extending the life of the memory.

(7) In a case that the facsimile apparatus uses a memory which enables to store data only in blocks, the block data is erased if the erasing condition of the block is met. When the request for sending or received data is issued while the data is being erased, it is checked that the number of the empty blocks is equal to or more than the predetermined number and then the operation is determined to be done. Hence, during the operation, the memory volume is secured. The data is allowed to be positively sent or received.

(8) In a case that the facsimile apparatus uses a memory which enables to store data only in blocks, when an operator erases data in the block, the termination of erasure is displayed at a time when the management data of the block requested to erase the erasing condition is erased. Then, the stored content is erased. By this operation, the operator can immediately make sure that the content is erased and does not have to wait until the actual erasure is done.

What is claimed is:

1. A communication apparatus comprising:
communication means for communicating speech messages as a function of a telephone answering machine;
a memory having a storage area divided into plural blocks and being erasable only in units of said plural blocks, said plural blocks including at least one block storing therein an answering speech message and including empty blocks;
first control means for controlling the function of the telephone answering; and
second control means for reading the answering speech message from said at least one block of said memory when said first control means starts the function of the telephone answering machine, and for selecting, when said communication means receives a speech message to be stored in said memory, a block from a head end of empty blocks of said memory and controlling said memory to store the received speech message into the selected block can be erased independently of the other blocks.

2. A communication apparatus according to claim 1, wherein:
the received speech message stored in the selected block is erased when the received speech message has been announced.

3. A communication apparatus according to claim 1, wherein:
the received speech message stored in the selected block is erased in accordance with an instruction of an operator.

4. A communication apparatus according to claim 1, wherein the received speech message stored in the selected block is erased in response to the received speech message being announced.

5. A communication apparatus according to claim 1, wherein the received speech message stored in the selected block is erased in accordance with an instruction of an operator.

6. An apparatus according to claim 1, wherein said memory is a flash memory.

7. In a telephone answering machine, a speech storing method comprising the steps of:
providing a memory for storing therein speech messages and having a storage area divided into plural blocks and being erasable only in units of blocks;
storing an answering speech message in a predetermined one of said blocks;
selecting, with receipt of a speech message to be stored in said memory, a block from a head end of blocks other than the predetermined block; and
controlling said memory to store the received speech message into the selected block such that the received speech message stored in said selected block can be erased independently of the other blocks.

8. A method for operating a telephone answering machine, said method comprising the steps of:
communicating speech messages as a function of a telephone answering machine;
storing an answering speech message in a first one of blocks of a storage area of a memory, said memory being erasable only in units of blocks;
controlling the function of the telephone answering machine;
reading the answering speech message from said first block of said memory when starting the function of said telephone answering machine;
selecting, when receiving a speech message to be stored in said memory, a second block from a head end of blocks other than said first block of said memory; and
controlling said memory to store the received speech message into the selected second block such that the received speech message stored in said selected second block can be erased independently of said first block.

9. A communication apparatus comprising:
a communication device that communicates speech messages as a function of a telephone answering machine;
a memory having a storage area divided into plural blocks and being erasable only in units of said plural blocks, said plural blocks including at least one block storing therein an answering speech message and including empty blocks;
a first control device that controls the function of the telephone answering machine; and
a second control device that reads the answering speech message from said at least one block of said memory in response to said first control device starting the function of the telephone answering machine, and for selecting, in response to said communication device receiving a speech message to be stored in said memory, a block from a head end of empty blocks of said memory and controlling said memory to store the received speech message into the selected block such that the received speech message stored in the selected block can be erased independently of the other blocks.

10. A communication apparatus comprising:
a communication device that communicates speech messages as a function of a telephone answering machine, said speech messages being an answering message of said machine and received speech messages that are received through said communication device;
a memory having a storage area divided into plural blocks and being erasable only block by block, said answering message and the received speech messages received through said communication device being respectively and distinguishably stored in said blocks; and
a control device that selects, for erasing one of said received speech messages stored in said memory, at least one corresponding block of said blocks to erase entirely said one of said speech messages stored therein.

11. An apparatus according to claim 10, wherein said second control device effects said erasing of the received speech message in response to an instruction of a user.

12. A communication apparatus comprising:

a communication device that communicates speech messages as a function of a telephone answering machine;

a memory having a storage area divided into plural blocks and being erasable only by a block erasing operation of erasing block by block; and a first control device that selects a first block of said plural blocks to store therein an answering message of said machine and that selects a second block of said plural blocks to store therein a received speech message received through said communication device; and a second control device that selects, for erasing the stored received speech message, said second block of said plural blocks to erase by said block erasing operation the received speech message stored in said second block selected by said second control device.

* * * * *